(12) United States Patent
Asakawa et al.

(10) Patent No.: US 6,609,806 B2
(45) Date of Patent: Aug. 26, 2003

(54) SPREAD ILLUMINATING APPARATUS

(75) Inventors: Toshiaki Asakawa, Iwata-gun (JP); Shigeyuki Adachi, Iwata-gun (JP); Shinichi Niwa, Iwata-gun (JP); Noboru Nishikawa, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/871,901

(22) Filed: Jun. 4, 2001

(65) Prior Publication Data
US 2001/0050848 A1 Dec. 13, 2001

(30) Foreign Application Priority Data
Jun. 7, 2000 (JP) .......................................... 2000-170761

(51) Int. Cl.⁷ ................................................. F21V 7/04
(52) U.S. Cl. ......................... 362/31; 362/339; 362/561; 362/26
(58) Field of Search ........................... 362/31, 26, 330, 362/339, 558, 559, 560, 551

(56) References Cited

U.S. PATENT DOCUMENTS

| | | | |
|---|---|---|---|
| 4,729,068 A | * 3/1988 | Ohe | ........................ 359/599 |
| 5,377,084 A | 12/1994 | Kojima et al. | ................. 362/31 |
| 6,219,117 B1 | * 4/2001 | Nagakubo et al. | ........... 349/113 |
| 6,286,970 B1 | * 9/2001 | Egawa et al. | ................... 362/31 |
| 6,295,104 B1 | * 9/2001 | Egawa et al. | ................... 349/63 |
| 2001/0012203 A1 | * 8/2001 | Suzuki et al. | ................. 362/31 |
| 2002/0036900 A1 | * 3/2002 | Suzuki et al. | ................. 362/31 |

* cited by examiner

Primary Examiner—Stephen Husar
Assistant Examiner—Ali Alavi
(74) Attorney, Agent, or Firm—Oliff & Berridge, PLC

(57) ABSTRACT

A clear image can be achieved by preventing dusts from collecting in grooves formed in a transparent substrate and by improving contrast as well. A film is provided in such a manner as to cover a light reflection pattern formed in the surface of the transparent substrate. The film is sealingly fixed to the transparent substrate for preventing dusts from entering the light reflection pattern (particularly the grooves) during the process of assembling the spread illuminating apparatus. Also, the surface of the transparent substrate can be protected from scratches thanks to the film fixed. The amount of interface reflection can be reduced by using resin or the like as the film material, and contrast can be improved by setting the thickness of the film to a value smaller than prescribed.

10 Claims, 4 Drawing Sheets

SPREAD ILLUMINATING APPARATUS

BACKGROUND OF THE INVENTION

1. Field of the Invention

The present invention relates to a spread illuminating apparatus, and more particularly to a spread illuminating apparatus used as an illuminating means for a reflection-type liquid crystal display.

2. Description of the Related Art

A liquid crystal display which is characterized by its small thickness, small occupied volume and light weight is used on many electrical products such as mobile phones and personal computers. Since a liquid crystal, which is a component member of the liquid crystal display, does not emit light by itself, the liquid crystal display requires an illuminating means for illuminating the liquid crystal when used in a place where sufficient sunlight or light from a lighting equipment is not available. Accordingly, it is also desired that the illuminating means be compact in size and low in power consumption. Therefore, it is essential to efficiently use light emitted from the illuminating means. An example of conventional spread illuminating apparatus to answer such demands is shown in FIG. 4.

A spread illuminating apparatus 1' in FIG. 4 is generally composed of a transparent substrate 2 made of a light-transmissible material and a light source 5 disposed close to an end surface 8 of the transparent substrate 2 and is adapted to make light emitted from the light source 5 enter the transparent substrate 2 thereby to illuminate a liquid crystal display (not shown) provided under the transparent substrate 2.

The light source 5 is composed of a light conductive member 3 made of a transparent member and shaped bar-like, and a spot-like light source (e.g. a light emitting diode) 4 provided at one end of the light conductive member 3. The light conductive member 3 is provided with an optical path conversion means 12. The optical path conversion means 12 is formed such that grooves having, for example, a triangular shape in section are disposed on a surface of the light conductive member 3 opposite to a surface 9 facing the end surface 8 of the transparent substrate 2, whereby light emitted from the spot-like light source 4 is made to enter the end surface 8 of the transparent substrate 2 in a substantially uniform manner. The light conductive member 3 is disposed along the end surface 8 of the transparent substrate 2 at a prescribed distance therefrom with the surface 9 facing the transparent substrate 2.

A frame (a light reflection member) 13 is provided around the light conductive member 3 in order to make the light emitted from the spot-like light source 4 efficiently enter the transparent substrate 2. The frame 13 is formed substantially in a U shape and covers the longitudinal surfaces of the light conductive member 3 except the surface 9 facing the transparent substrate 2. A film having a metal such as silver evaporated on, a hard resin member having a white film or the like adhered to, or a bent metal plate of aluminum or stainless steel is attached to the inner surface of the frame 13.

A light reflection pattern 19 is formed on an upper surface 16 of the transparent substrate 2. The light reflection pattern 19 is composed of grooves 17 triangular in section and flat portions 18 adjacent to the grooves 17. And, the grooves 17 and the flat portions 18 are formed in parallel to the light conductive member 3 at prescribed intervals. The grooves 17 are each formed with a different width so that light which comes from the light conductive member 3 and enters the transparent substrates can be reflected substantially uniformly on the entire surface of the transparent substrate 2 irrespective of the distance from the light conductive member 3 (the light source 5) to desirably illuminate a liquid crystal display 10 provided under the transparent substrate 2. Specifically, the ratio of the width of the grooves 17 to the width of the flat portions 18 increases gradually in proportion to the increase in distance from the light conductive member 3.

As described above, the spread illuminating apparatus 1' is assembled by putting together the transparent substrate 2, the light source 5 (the light conductive member 3 and the spot-like light source 4), the frame 13, and others. In order to achieve clearer images with the spread illuminating apparatus 1' thus constructed, it is desirable for light coming from the light conductive member 3 and entering the transparent substrate 2 to be efficiently reflected by the light reflection pattern 19 toward the liquid crystal display. However, actually it is not possible to reflect all incident light toward the liquid crystal display, and part of the incident light undergoes interface reflection (Fresnel reflection) giving a part of reasons for the reduction in contrast. In addition, since the transparent substrate 2 is put together with other members with its surface exposed, it can happen that not only the surface of the transparent substrate 2 is scratched during the assembly process, but also fragments of the transparent substrate 2 or other dusts collect in the grooves 17 of the light reflection pattern 19. These cause a deterioration in the light conduction performance of the transparent substrate 2.

SUMMARY OF THE INVENTION

The present invention has been made in view of the above, and an object of the present invention is to prevent dusts from getting on the light reflection pattern of the transparent substrate and also to prevent the surface of the transparent substrate from getting scratched during the process of assembling the spread illuminating apparatus, and another object thereof is to improve the contrast of the spread illuminating apparatus.

In order to solve the above problems, according to a first aspect of the present invention, there is provided a spread illuminating apparatus in which a light reflection pattern is formed on a surface of a transparent substrate made of a light-transmissible material and in which a bar-like light source is disposed close to a side surface of the transparent substrate, wherein a film is disposed on the transparent substrate so as to cover the light reflection pattern. With the film covering the light reflection pattern formed on the transparent substrate, it is possible to prevent the surface of the transparent substrate from getting scratched during the assembly process.

According to a second aspect of the present invention, the film is sealingly fixed to the transparent substrate. Sealingly fixing the film to the transparent substrate surely prevents dusts from getting in between the film and the transparent substrate.

According to a third aspect of the present invention, the film is made of resin, and according to a fourth aspect of the present invention, the film is made of glass. Using resin or glass as a film material enables both an efficient transmission of light and a reduction of interface reflection (Fresnel reflection).

According to a fifth aspect of the present invention, the thickness of the film is 2 mm or less. In consideration of the fact that the amount of light transmitted toward screen observation is reduced due to the film covering the surface of the spread illuminating apparatus, the thickness of the film is set to a prescribed value of 2 mm or less thereby to improve the contrast.

DETAILED DESCRIPTION OF PREFERRED EMBODIMENTS

The embodiments of the spread illuminating apparatus of the present invention will be hereinafter described with reference to the attached drawings. Note that parts identical with or equivalent to those in the conventional art are indicated by the same references and a detailed description thereof is omitted.

Figure 1:
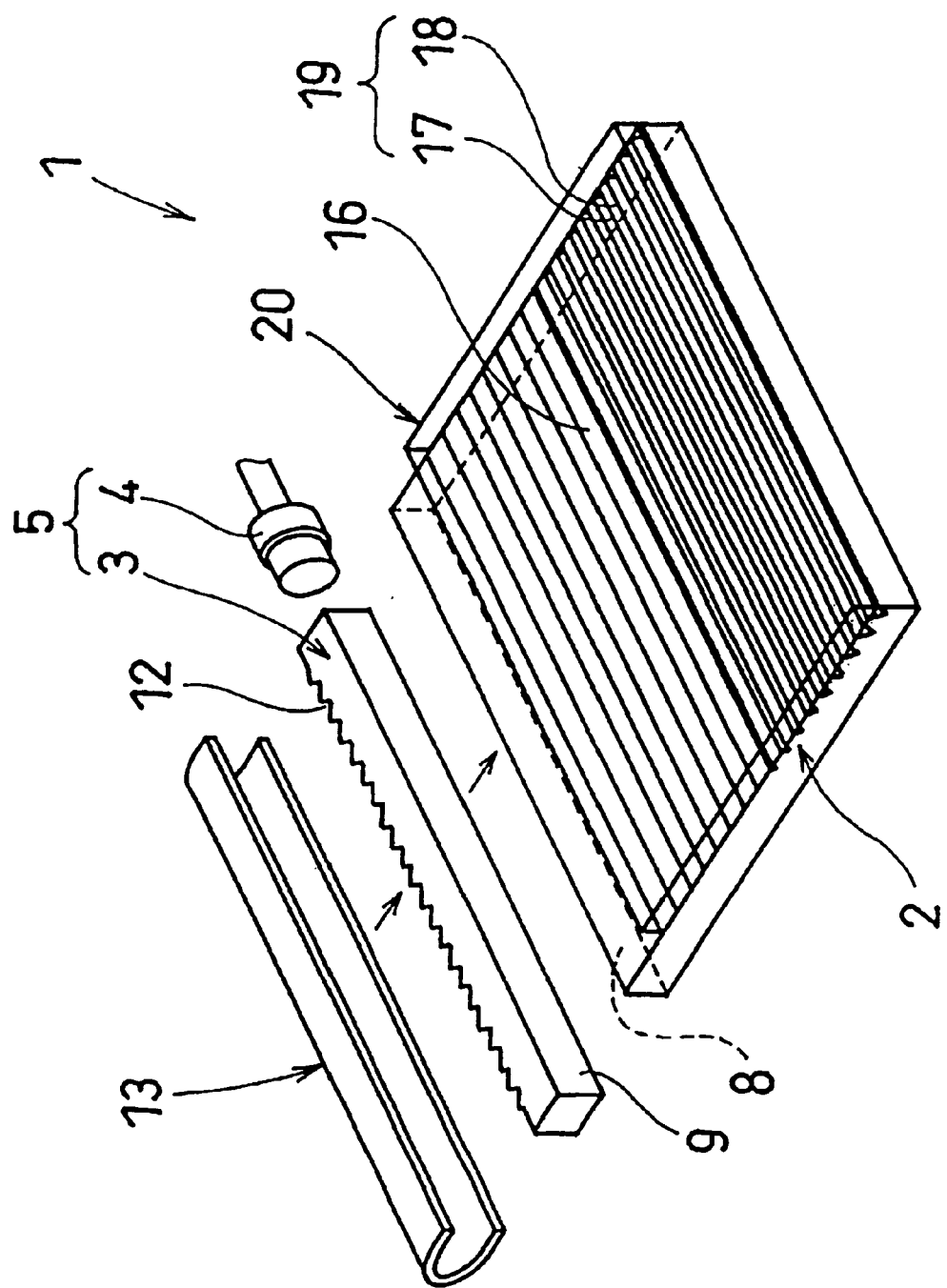
FIG. 1 is an exploded perspective view showing an embodiment of the spread illuminating apparatus according to the present invention.
Figure 2:
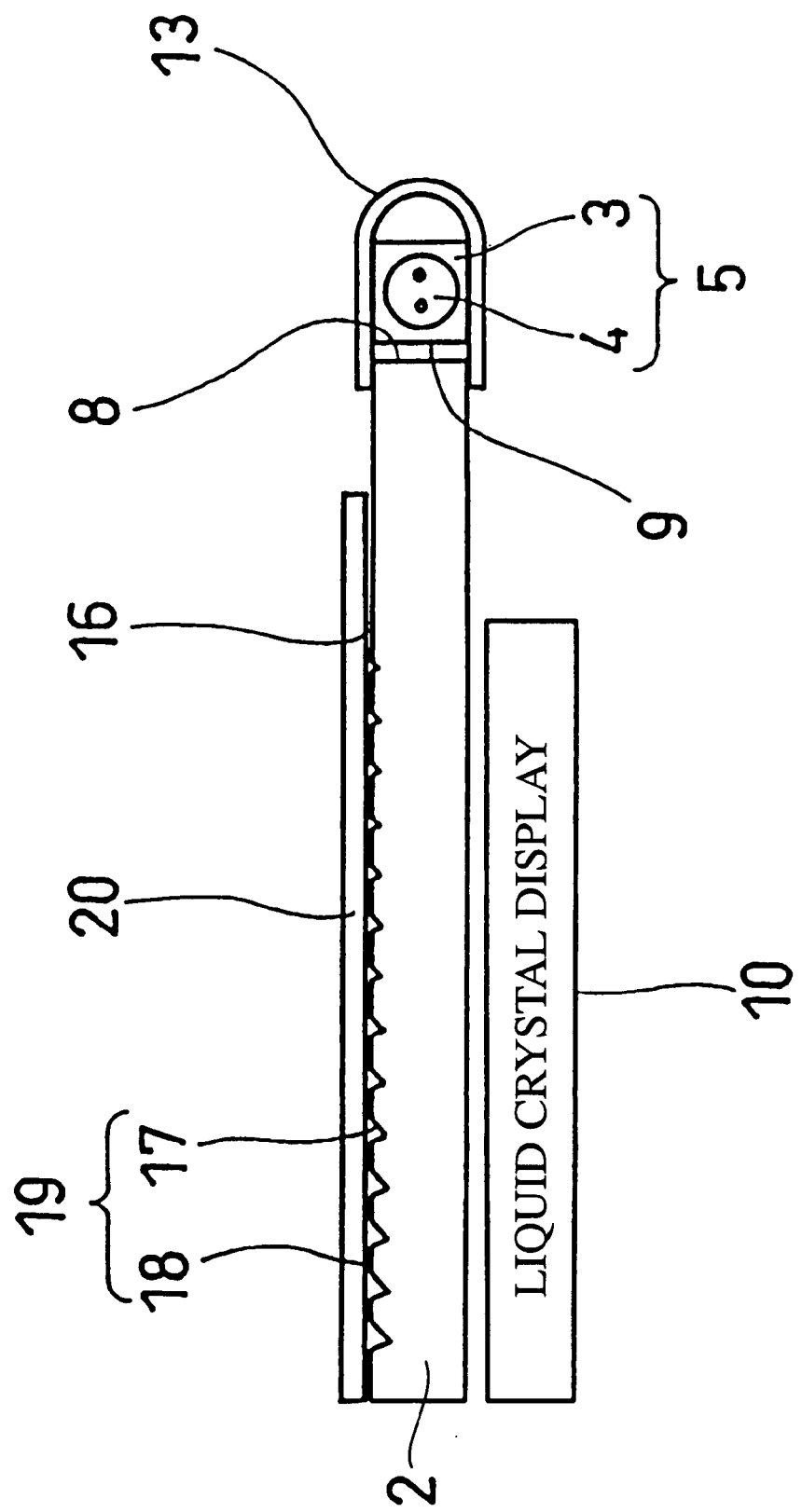
FIG. 2 is a side view showing the assembly of the spread illuminating apparatus shown in FIG. 1.

FIG. 1 is an exploded perspective view showing one embodiment of the spread illuminating apparatus according to the present invention, and FIG. 2 is a side view showing the assembly of the spread illuminating apparatus of FIG. 1.

As shown in the drawings, the spread illuminating apparatus 1 is assembled such that a transparent substrate 2, a light source 5 comprising a light conductive member 3 and a spot-like light source (e.g. a light emitting diode) 4, and a frame 13 covering the light conductive member 3 are put together in the direction of the arrows in FIG. 1.

An optical path conversion means 12 is provided on one side surface of the light conductive member 3, whereby light emitted from the spot-like light source 4 into the light conductive member 3 is guided uniformly into the transparent substrate 2 irrespective of the distance from the spot-like light source 4. The frame 13 is formed by bending a metal plate, and a film (not shown) on which a metal such as silver is evaporated is attached to the inner surface of the frame 13 in order to efficiently reflect the light emitted from the light conductive member 3. The depth of the frame 13 covering the light conductive member 3 is greater than the width of the light conductive member 3, whereby plate ends of the frame 13 having a U-shape configuration overlap and cover the end portion of the transparent substrate 2 when the spread illuminating apparatus 1 is assembled.

A light reflection pattern 19 is formed at an upper surface 16 of the transparent substrate 2 in order to reflect the light guided from the light conductive member 3 into the transparent substrate 2. Thanks to the light reflection pattern 19, the light guided into the transparent substrate 2 is capable of uniformly illuminating, from the entire surface of the transparent substrate 2, a liquid crystal display (not shown) provided under the transparent substrate 2. The light reflection pattern 19 is composed of grooves 17 triangular in section and flat portions 18 adjacent to the grooves 17. The grooves 17 and the flat portions 18 are formed in parallel to the longitudinal direction of the light conductive member 3 at prescribed intervals.

In this embodiment, the depths of the grooves 17 are set constant and the widths of the flat portions 18 are each set different from others so that the light guided from the light conductive member 3 can be reflected substantially uniformly on the entire surface of the transparent substrate 2 irrespective of the distance from the light conductive member 3 (the light source 5) thereby to uniformly illuminate the liquid crystal display (not shown) provided under the transparent substrate 2.

Note that the light reflection pattern 19 does not have to be structured as described in this embodiment and any other structures may be taken as long as the liquid crystal display can be uniformly illuminated. For example, although not illustrated, the light reflection pattern 19 may be structured in such a manner that the grooves 17 are formed at a fixed interval while the depth thereof increases gradually in proportion to the increase in distance from the light conductive member 3, or the two examples described above may be combined. Furthermore, it may be structured such that the grooves 17 having a triangular section are disposed continuously without providing the flat portions 18.

A film 20 is provided on the upper surface 16 of the transparent substrate 2 so as to cover the light reflection pattern 19 formed on the upper surface 16. The material for the film 20 can be any substance that allows light to pass through efficiently. Alkaline resin is suitable for its workability and transparency. Other suitable materials include polyethylene terephthalate (PET), polycarbonate, vinyl chloride, general olefin based resin films, and glass films.

The film 20 used is not subjected to surface treatment, but the present invention is not limited thereto. The film 20 may be provided with a reflection preventive membrane or subjected to non-glare or hard coat processing, which enables a clearer image to be displayed.

The film 20 provided over the surface of the transparent substrate 2 is sealingly fixed to the transparent substrate 2 by an adhesive material. The adhesive material is applied only to the border of the film 20 at a prescribed width (for example, approximately 5 mm) in order not to deteriorate the light conductive properties of the film 20. Note that the fixing method is not limited thereto and other examples include a fusion method by means of an ultrasonic wave or a mechanical method by means of guides formed on the film 20 for mechanical engagement. In the process of assembling the spread illuminating apparatus 1, the film 20 is sealingly fixed to the transparent substrate 2 before the respective members constituting the spread illuminating apparatus 1 are put together. Thus, dusts raised during the assembly process can be prevented from getting in between the transparent substrate 2 and the film 20. And, because the surface of the transparent substrate 2 is covered with the film 20, it does not make a direct contact with other members or an assembly machine for the spread illuminating apparatus, thereby eliminating scratches that may result from a direct contact with the assembly machine and the like during the assembly process.

An explanation will now be given concerning the thickness of the film 20.

Figure 3:
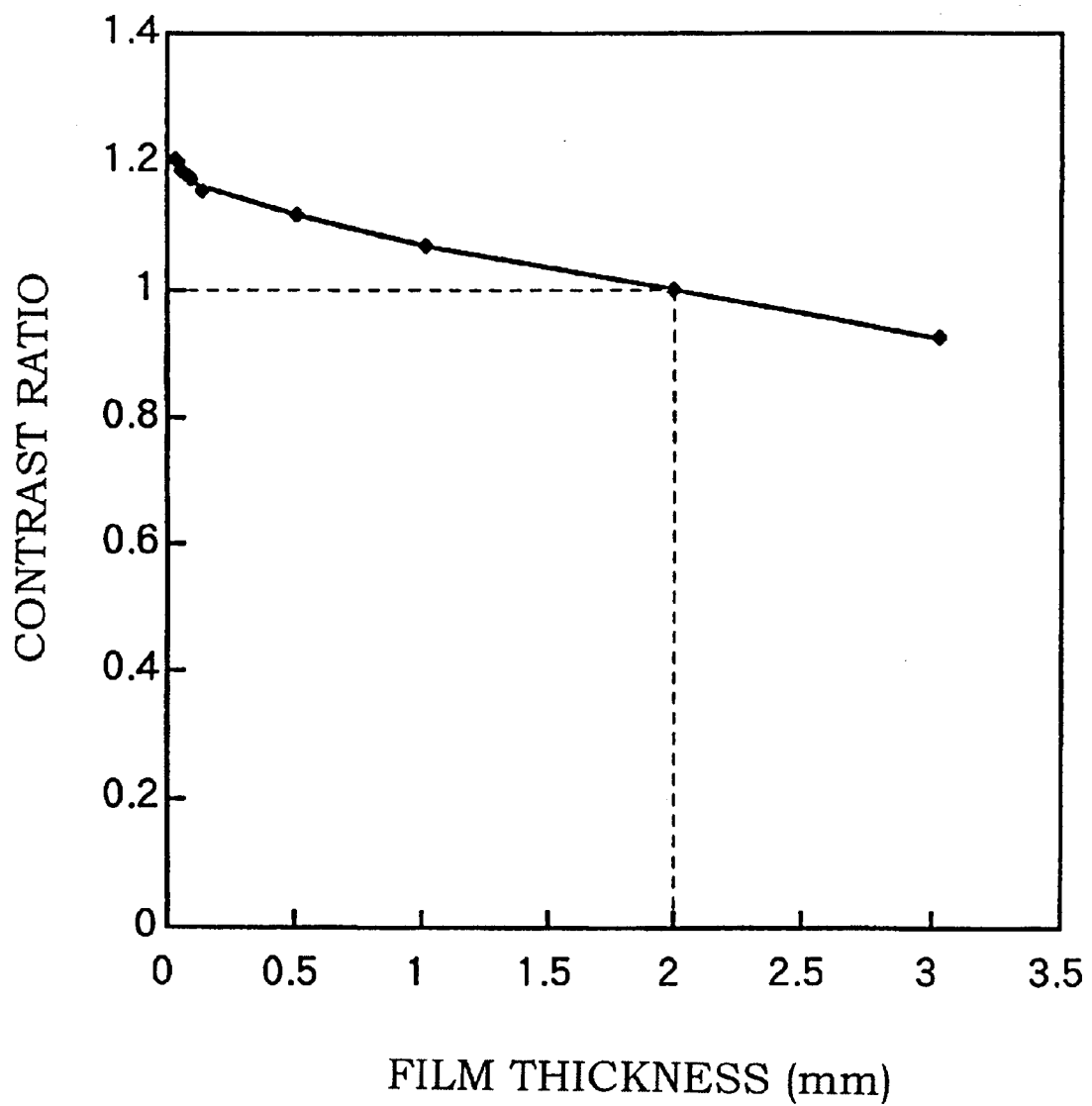
FIG. 3 is a graph showing the contrast ratios of an image measured when a film is adhered to the transparent substrate.
Figure 4:
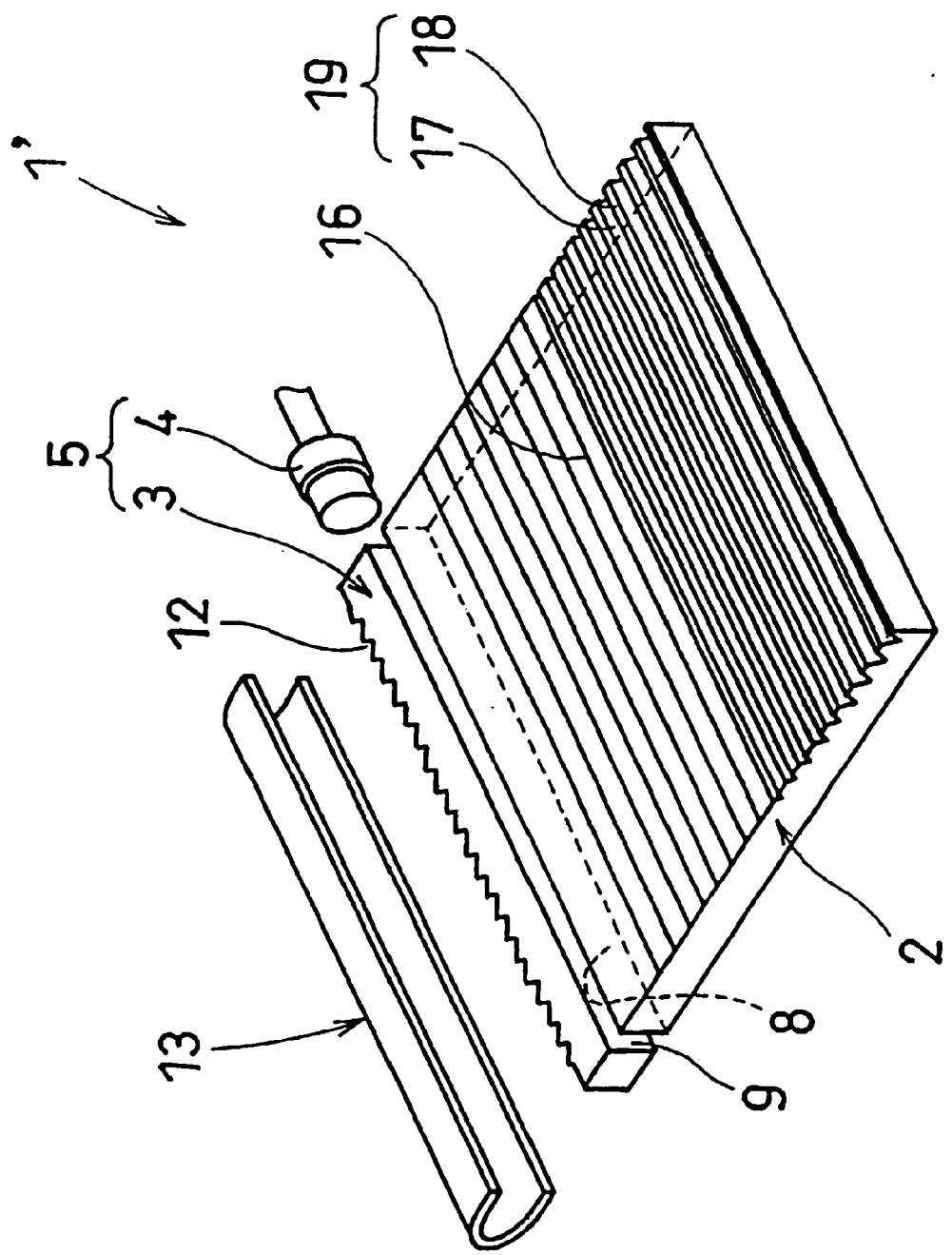
FIG. 4 is an exploded perspective view showing a conventional spread illuminating apparatus.

FIG. 3 is a graph which shows the contrast ratios of an image measured when the film 20 is fixed to the transparent substrate 2 with an adhesive material. The transparent substrate 2 and the film 20 used are both made of a polycarbonate material, wherein the contrast ratios were measured when the thickness of the film 20 was changed within the range of 25 $\mu$m to 3 mm. Here, the contrast ratio refers to the ratio of white luminance to black luminance (white luminance/black luminance), where the white luminance and the black luminance are obtained by measuring the respective levels of luminance by using a luminance meter when the light source 5 is turned on with a white sheet and a black sheet laid over the back surface of the transparent substrate 2, respectively, and where the contrast ratio gained with no film 20 adhered is rated as 1.

As shown in FIG. 3, the contrast ratio increases when the film 20 adhered becomes thinner. For example, the contrast improves approximately 10% when a film with a thickness of 500 µm is adhered, and the contrast improves approximately 20% when a film with a thickness of 25 µm is adhered. Reversely, the contrast ratio decreases when the film 20 adhered becomes thicker and it shows a value substantially equivalent to the contrast ratio gained with no film adhered (contrast ratio is 1) when the film 20 has a thickness of 2 mm.

The effect of the improvement in contrast ratio by adhering a film (2 mm or less in thickness) to the transparent substrate 2 is considered as coming from the following mechanism. Light emitted from the light source 5 enters the transparent substrate 2, is reflected by means of the light reflection pattern 19, illuminates the liquid crystal display provided under the transparent substrate 2, reaches a reflection plate provided under the liquid crystal display and is reflected there so as to display images on the display screen. However, it does not happen that all of the light emitted from the light source 5 follows the above mechanism, instead part of the light, which is reflected at the upper surface 16 (the grooves 17 and the flat portions 18 of the light reflection pattern 19) of the transparent substrate 2, the lower surface (the opposite surface to the upper surface 16) thereof or the surface of the liquid crystal display, does not reach the reflection plate provided under the liquid crystal display but is reflected toward the screen observation, that is the display screen side. Where the amount of light subjected to so-called interface reflection (Fresnel reflection) increases, the contrast ratio decreases rendering the display screen whitish, whereby the images become difficult to observe. The amount of the interface reflected light can be reduced by adhering the film 20 to the transparent substrate 2. This is because the light is absorbed by the film (polycarbonate in this embodiment) 20 (the light is shut up by the effect of the reflectance of the film) thereby to reduce the amount of the interface reflected light which passes toward the display screen. The absorption of light by the film 20 may reduce the contrast because the light reflected by the reflection plate disposed under the liquid crystal display is also absorbed by the film 20, but the contrast ratio improves as a whole because the reduction in the amount of the black luminance due to the absorption of the interface reflected light overcomes the reduction in contrast. If the thickness of the film 20 is increased (more than 2 mm), the contrast ratio as a whole decreases to be lower compared with when the film 20 is not adhered. This is because the increase in the amount of light absorbed by the film itself (the light absorption depends on the thickness of film according to Lambert's law), apart from the reflection of light at the reflection plate, has a greater effect than the improvement in contrast due to the reduction in black luminance.

As described above, according to a spread illuminating apparatus of the present invention, the provision of a film covering the light reflection pattern formed on the surface of the transparent substrate enables the prevention of the ingress of dusts which are apt to collect on the light reflection pattern, particularly in the grooves, during the process of assembling the spread illuminating apparatus. Consequently, defective dots, which are caused due to the dusts collecting and appear on the screen when images are displayed, can be eliminated and reduction in contrast can be prevented as well. And, sealingly fixing the film to the transparent substrate using an adhesive material or the like surely prevents the dusts from getting in between the transparent substrate and the film. And, because the surface of the transparent substrate is covered with the film, the surface of the transparent substrate can be prevented from directly touching other members or an assembly machine for the spread illuminating apparatus, whereby the surface of the transparent substrate can be protected from scratches.

Furthermore, because the amount of interface reflection can be reduced by using resin or glass for the film material and because the contrast ratio can be improved by setting the thickness of the film to a value smaller than prescribed, clear images can be realized.

What is claimed is:

1. A spread illuminating apparatus in which a light reflection pattern is formed on a surface of a transparent substrate made of a light-transmissible material and in which a bar-like light source is disposed close to a side surface of said transparent substrate, wherein said transparent substrate is placed over a liquid crystal display, the spread illuminating apparatus, comprising:

a transparent film provided over said transparent substrate so as to cover said light reflection pattern.

2. The spread illuminating apparatus according to claim 1, wherein said film is sealingly fixed to said transparent substrate.

3. The spread illuminating apparatus according to claim 1, wherein said film is made of resin.

4. The spread illuminating apparatus according to claim 1, wherein said film is made of glass.

5. The spread illuminating apparatus according to claim 1, wherein said film has a thickness of 2 mm or less.

6. The spread illuminating apparatus according to claim 2, wherein said film is made of resin.

7. The spread illuminating apparatus according to claim 2, wherein said film is made of glass.

8. The spread illuminating apparatus according to claim 2, wherein said film has a thickness of 2 mm or less.

9. The spread illuminating apparatus according to claim 3, wherein said film has a thickness of 2 mm or less.

10. The spread illuminating apparatus according to claim 4, wherein said film has a thickness of 2 mm or less.

* * * * *